United States Patent [19]

Selin et al.

[11] 4,081,518
[45] Mar. 28, 1978

[54] GASEOUS PRODUCT STREAM

[75] Inventors: Clifford E. Selin, Salt Lake City, Utah; Wayne A. Proell, Seymour, Ind.

[73] Assignee: American Hydrocarbon Company, Salt Lake City, Utah

[21] Appl. No.: 732,037

[22] Filed: Oct. 13, 1976

[51] Int. Cl.$^2$ ............................................. C01B 21/36
[52] U.S. Cl. .................................... 423/400; 423/393; 423/235
[58] Field of Search ............... 423/235, 392, 393, 394, 423/400, 402, 403

[56] References Cited

U.S. PATENT DOCUMENTS

| | | | |
|---|---|---|---|
| 1,989,267 | 1/1935 | Caro et al. | 423/400 |
| 3,658,472 | 4/1972 | Aguinet et al. | 423/393 |
| 3,809,744 | 5/1974 | von Semel | 423/400 |
| 3,927,182 | 12/1975 | Powell | 423/392 |

Primary Examiner—G. O. Peters

[57] ABSTRACT

A method for the removal of nitrogen oxides from the off-gases of a nitric acid manufacturing facility. The off-gases containing the nitrogen oxides are first contacted at atmospheric pressure and at a temperature below about 90° F with a countercurrently flowing stream of about 10 to about 35% by weight nitric acid to absorb the nitrogen oxides. The rate of flow of the nitric acid is controlled so that the partial pressure of the nitrogen oxides absorbed in the nitric acid is lower than the partial pressure of the nitrogen oxides in the off-gas feed stream. The nitric acid containing the absorbed nitrogen oxides is then countercurrently contacted with a small amount of air at a temperature between about 60° and about 120° F to liberate the absorbed nitrogen oxides so that they can be returned to the reactor section of a nitric acid plant. The nitric acid being recycled to absorb more nitrogen oxides.

2 Claims, 2 Drawing Figures

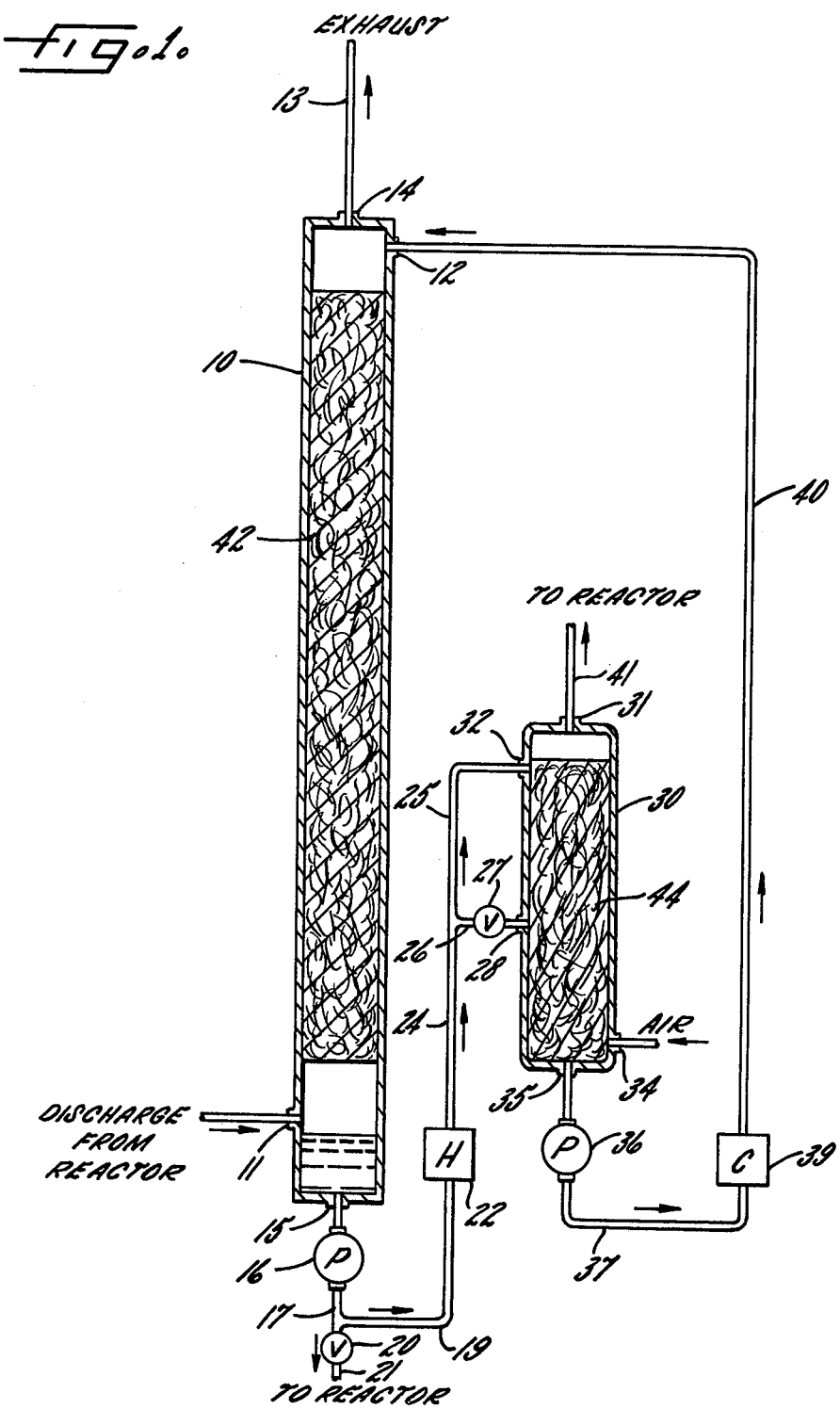

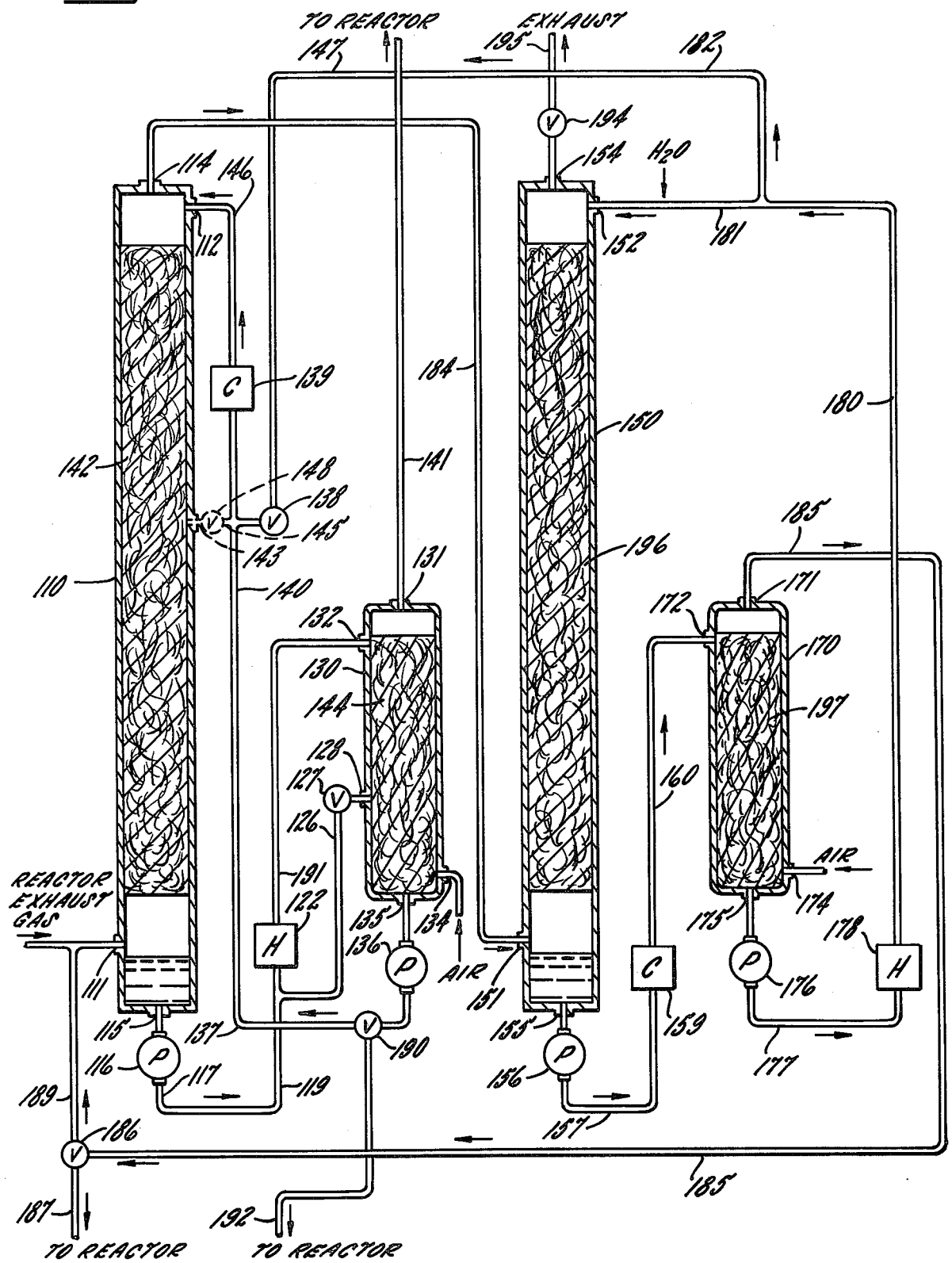

GASEOUS PRODUCT STREAM

BACKGROUND OF THE INVENTION

This invention relates to the removal of lower concentrations of reactive gases from a gaseous product stream and, more particularly, to the removal of low concentrations of nitrogen oxides (hereinafter referred to as "NOx") from a nitric acid gaseous product stream.

As for example, nitric acid gaseous product streams from various production processes, both atmospheric and superatmospheric processes contained admixed NOx. When this admixed NOx falls below 0.5% it is difficult and/or expensive to remove by the known extraction processes. It is desirable both from an economical standpoint and an environmental impact standpoint to minimize this dissolved NOx. It may be desirable, however, to apply the invention disclosed herein to gases containing as much as 2.5% NOx for reasons associated with the engineering of a complete nitric acid plant.

First, the admixed NOx represents a reactive species that could be further processed to yield additional nitric acid product and thereby increase the yield of the overall process. Secondly, as NOx is toxic and potentially hazardous, the Environmental Protection Agency has set minimum standards for NOx that can be vented to the atmosphere. It is usually required that a final level of not more than about 0.015% NOx be attained. Heretofore, the low concentrations of NOx have been removed from nitric acid product streams by high pressure multiple stage absorption, catalytic combustion and catalytic reaction with ammonia. These methods have, however, proved to be either expensive or inefficient.

Accordingly, it is an object of this invention to provide an improved apparatus and process for removing low concentrations of an admixed reactive gas from a gaseous stream, which apparatus and process are both economical and efficient, and applicable to streams containing excess oxygen.

Another object of this invention is to provide an apparatus and process for physically removing low concentrations of admixed reactive gas from a gas stream and that the product removed can be further processed to yield additional nitric product.

Other objects and advantages of the present invention will become apparent upon reading the following detailed description and upon reference to the attached drawings.

BRIEF DESCRIPTION OF THE INVENTION

FIG. 1 is a diagrammatic view, sectioned vertically for clarity, of one embodiment of an absorber-desorber section, constructed in accordance with the present invention and employing the process of the invention with the absorber-desorber being run in a single pass mode.

FIG. 2 is a diagrammatic view, sectioned vertically for clarity, of another embodiment of an absorber-desorber section; constructed in accordance with the present invention and employing the process of the invention with the absorber-desorber being run in a double pass mode.

BRIEF DESCRIPTION OF THE INVENTION

The new apparatus and process herein described employs a physical absorber and a physical desorber unit operated in tandem to remove low concentrations of a sparingly soluble gas from a gaseous stream. As for example, it may be employed to remove NOx from the gaseous exhaust of a nitric acid plant.

The use of tandem pairs of absorber and desorber units maximizes the rate of physical removal of NOx from this product stream and thereby recovers the NOx with practical levels of extraction intensity, normally lost to the off-gases which go to the atmospheres. As the NOx can be converted to nitric acid product, this recovery of NOx represents a real economic advantage of the apparatus and process of the present invention over existing "clean up" processes.

Specifically, the present invention employs the combination of an absorber unit and a desorber unit operated in tandem. In both the absorber unit and the desorber unit various parameters (to be discussed in detail later), as for example, the operating temperatures, the feed rates (both gas and liquid) and the concentration of recycled nitric acid are controlled within predetermined limits so that the formation of relatively insoluble nitric oxide (NO) is controlled. We have found that with the controls herein described the amount of NOx in the final exhaust gas has been minimized (i.e., about 0.02%) at practical levels of extraction intensity. Further, the gas feed inputs, the mass flow of stripper liquid and the packing employed in the units are closely controlled to maximize the mass transfer in the units.

According to one of the important aspects of the invention there is provided a primary absorbing unit which comprises a multiple plate extraction tower which operates in tandem with a primary desorbing unit which comprises a multiple plate stripping tower. These units are operated to maximize mass transfer in the extraction and stripping towers and also to maximize the gradient of NOx concentration in the towers.

In the primary absorbing unit the operating temperature of the unit, the feed rate of liquid to be processed, the feed rate of gas, the feed rate of the absorbing liquid and the concentration of the absorbing liquid are carefully controlled to insure multiple plate extraction. Of these, the major variable is the temperature in the unit. The temperature at the bottom of the unit is below about 90° F., preferably below about 70° F., and the temperature at the top of the unit being above the freezing point of the absorbing liquid, preferably above about 35° F. It is important to keep the temperature at any point in this unit below about 90° F. since above this temperature the dissolved NOx will react to regenerate insoluble nitric oxide, thereby diminishing the extracting function of the unit. While nitric acid (NO) is always contained in the so-called NOx, and is removed with other nitrogen oxides (e.g., $N_2O_3$, $N_2O_4$ and $NO_2$), we have found that increasing its amount by allowing $NO_2$ to react with warm acid extractant is unfavorable in that the amount of less soluble NO increases. Further, the unit must be operated at a temperature above that of the freezing point of the absorbing liquid since the unit will not function below this temperature.

The absorbing liquid serves to extract the NOx from the gaseous product stream in the unit. While any liquid which is capable of dissolving NOx at temperatures between about 35° to about 90° F. may be employed, nitric acid at a concentration of between about 10 to about 35% (by weight), preferably between about 15 to about 20% is the preferred absorbing liquid to avoid hazards, reagent usage, or recovery problems.

This absorbing liquid is fed into the primary absorber near the top of the unit and descends through the unit contacting the gases (containing the dissolved NOx) which are rising in the unit in a countercurrent manner. The unit is provided with an inert packing or bubble plates so that the contact area and contact time between the descending liquid and the rising gases is increased. In the embodiments shown in the drawings stainless steel chips are employed as the inlet packing. It is to be noted that whatever packing is employed, the objective of the packing is to establish multiple plate conditions, e.g., maximize the gradient of NOx concentration in the tower both in the liquid and gas phase. The absorbing liquid contacts the ascending gases and absorbs the NOx contained therein.

To effect this absorption, several parameters must be controlled in this unit. The rate of absorbing liquid fed to the unit and the temperature in the unit must be coordinated so that the liquid near the bottom of the unit will physically dissolve a predetermined amount of NOx. NOx is sparingly soluble in the practical extractants, and at low concentrations (e.g. below about 0.5%) is difficult, indeed, to extract in practicable amounts. If the temperature at the bottom is too high or the recycle rate too low the NOx will desorb from the absorbing liquid and ascend upwards in the unit and not exit the unit with this liquid. The result is that insufficient NOx will be contained in the liquid when it enters the cooperating desorbing unit.

Further, the rate of recycle absorbing liquid fed into the absorber unit and the temperature at the top of the unit must be coordinated so that the partial pressure of the NOx dissolved in this liquid is less than the partial pressure of the NOx in the treated gases leaving the unit. If the partial pressure of the NOx in the absorbing liquid is not less than that of the NOx in the gas stream, then the absorbing liquid will not adequately extract the NOx from this gas stream. This controlled condition must exist at both the top and the bottom of the unit, and that requires that both the amount and temperature of the liquid be controlled in proportion to the NOx in the entering gas.

According to another important aspect of the invention there is provided a primary desorbing unit which comprises a multiple plate stripping tower which coordinates with the primary absorbing unit. In this unit the NOx previously extracted by the recycling absorbing liquid in the primary absorber is desorbed or stripped and the gases are returned to a reactor section for further processing to yield additional nitric acid product. In general, it is easier to desorb Nox than to absorb it, as the NOx can be converted to insoluble NO by raising the temperature, thus removing NOx by physical desorption and disproportionation.

This unit is physically similar to the absorbing unit but is somewhat smaller in size and so arranged that the stripping liquid containing absorbed NOx enters the unit near its top and a stripper gas enters the unit near its bottom. In the unit the liquid, containing the dissolved NOx, descends by reason of gravity and as it does so it contacts the stripper gas which is rising in the unit in a countercurrent manner. This desorbing unit is also provided with an inert packing or bubble plates to insure good contacting between the descending liquid and the rising stripper gas and to favor a NOx gradient in the tower.

The cooperating desorbing unit is operated at slightly superambient temperature for two reasons, viz, to reduce the solubility of NOx, and to disproportionate dissolved $NO_2$ into insoluble NO and nitric acid, thus insuring good stripping action by the stripper gas, as for example, the unit should be run at a temperature of between about 60° to about 120° F., and there should be a slight temperature gradient in the unit. The feed rate of stripper gas into this unit is dependent upon the feed rate of liquid into the unit from the primary absorbing unit. However, in general, this feed rate of stripper gas should be such that the stripper gas picks up the total amount of NOx dissolved in the stripping liquid fed to the unit. This is accomplished when the partial pressure of NOx in the stripping gas is less than the partial pressure of the NOx in the liquid feed. The amount of liquid fed into the top of the unit at a given temperature is determined by the amount of the stripping gas available and the desired reduction of NOx and the amount of recycle. The temperature at the bottom of the unit is critical (e.g., about 60° to about 120° F.) as the partial pressure of NOx becomes quite low when the concentration of NOx in the liquid phase is low. This liquid, now virtually NOx free, is recycled to the absorbing unit as the extracting or absorbing liquid. The stripping gas, now containing NOx, is desirably returned to a reactor section for further processing to form additional nitric acid product. It will be recognized that the solubility and partial pressures are functions of time $f(t)$ in the unit and that the least concentration of NOx in the gas phase is the gas in contact with the liquid that is most depleted of NOx and conversely in the desorber.

Additionally, the temperature at the bottom of the unit must be such that the NOx partial pressure over the liquid must be much greater than the partial pressures of NOx in the air of stripping gas.

If desired, several sets of cooperating absorbing units and desorbing units may be employed. This is desirable when the reactor off gases contains high (i.e., between about 0.5 to about 2.5%) concentrations of NOx, since optimum temperatures for high NOx feeds as defined above differ from those temperatures for the low (e.g., 0.4% or less) range.

While the invention is susceptible to various modifications and alternative forms, two preferred embodiments thereof have been shown in the drawing and will be described in detail hereinafter. In these embodiments vertical towers are shown. It should be understood, however, by those skilled in the art that it is not intended to limit the invention to the particular form disclosed, but, to the contrary, the intention is to cover all modifications, equivalents, and alternatives falling within the spirit and scope of the invention. For example, it should be appreciated that horizontal-oriented, gas-liquid contact apparatus as is known, may be employed in the place of the vertical apparatus of the preferred embodiment herein disclosed without departing from the scope of the present invention.

DETAILED DESCRIPTION OF THE INVENTION

Turning to the drawings, there is shown in FIG. 1 an illustrative embodiment of an absorbing-desorbing system for carrying out the process of the present invention. In this embodiment there is shown one absorbing unit and a cooperating desorbing unit. There is shown a vertically disposed absorbing unit comprising a multiple plate stripping tower 10 of about 24 feet in height and 10 feet in diameter having a gas inlet 11 near its base, a gas outlet 14 located at the top of the tower, a liquid inlet 12 located near the top of the tower and a liquid outlet 15 located at the bottom of the tower.

There is also shown in the drawing a second vertically disposed tower 30, the desorbing unit, which is approximately 22 feet in height and 5 feet in diameter. This second tower 30 has a gas inlet 34 near its base, a gas outlet 31 at its top, a liquid inlet 32 near its top, a liquid inlet 28 near its midpoint and a liquid outlet 35 at its bottom.

The liquid outlet 15 in tower 10 is connected to the liquid inlets 28 and 32 in tower 30 by means of a pump 16, a pipe 17, a pipe 19, a heater 22, a pipe 24 and a pipe 25. The liquid outlet 35 in tower 30 is connected to the liquid inlet 12 in tower 10 by means of a pump 36, a pipe 37, a heat exchanger 39 and a pipe 40. There is also provided between pipe 17 and pipe 19 a valve 20 which communicates with pipe 21. Both tower 10 and tower 30 are provided with a packing 42 and 44 respectively which comprises stainless steel chips. In operation, a gaseous discharge of 114,030 pounds per hour from a nitric acid process reactor containing about 0.35% NOx is fed into the tower 10 by means of gas inlet 11. A stripping liquid comprising nitric acid of 248,220 pounds per hour at a concentration of between about 10 to about 35% (by weight), preferably about 20% is fed into tower 10 through liquid inlet 12. The stripping liquid descends the tower 10 by reason of gravity into packing 42 where it countercurrently contacts the gases, fed into the tower 10 through inlet 11, which are rising in the tower. The descending liquid strips the NOx from the ascending gases. It is important to note that the temperature of the tower be maintained subambient. That is, this temperature should be between about 25° to about 90° F., preferably about 35° F., to provide a maximum stripping of NOx from the ascending gases by the liquid. Any temperature gradient in the tower should be minimal, and the tower should be colder at its top and warmer at its bottom, to maximize NOx absorption by this liquid. One hundred fourteen thousand three hundred and forty five pounds per hour of gas containing about 0.02% $NO_2$ is exhausted to the atmosphere through gas outlet 14 and pipe 13.

After the liquid, now containing absorbed NOx, leaves the packing 42 it exits tower 10 by means of liquid outlet 15 where it is pumped by means of pump 16 into pipe 17. There is provided a valve 20 that bleeds some of the NOx rich liquid off from pipe 17 through pipe 21 before it enters pipe 19. The liquid flows through line 19 into a heat exchanger 22 where it is heated to a temperature of about 120° F., and then passes through pipe 24 into pipes 25 and 26. The liquid in pipe 25 enters tower 30 through liquid inlet 32. The liquid in pipe 26 passes through a regulator valve 27, which serves to coordinate the flow of liquid into tower 30 by means of liquid inlet 28. Once inside tower 30 the liquid descends by reason of gravity through the packing 44 where it countercurrently contacts a stripping gas, preferably air, which after entering tower 30 through gas inlet 34, at a rate of 7875 pounds per hour, ascends the tower 30 into packing 44. As the NOx partial pressure in this stripping gas is much, much less than the NOx partial pressure in the liquid, the stripping gas desorbs the NOx dissolved in the liquid to leave the liquid virtually NOx free.

This liquid exits tower 30 by means of liquid outlet 35 where it is forced by means of pump 36 into pipe 37 through heat exchanger 39 where it is cooled to about 35° F. From heat exchanger 39 the liquid passes through pipe 40 and is returned to tower 10 through liquid inlet 12 to serve as the absorbing liquid for this tower.

The stripping gas, now containing about 125 pounds per hour of $NO_2$, exits tower 30 through gas outlet 31. This gas then passes through pipe 41 where it is returned to the reactor section (not shown) for further conversion to additional nitric acid product.

In FIG. 2 there is shown a pair of cooperating absorbing and desorbing units. In this embodiment there are two absorbing units and two cooperating desorbing units. As seen in FIG. 2 there is shown a vertically disposed absorbing unit comprising a multiple plate stripping tower 110 of about 25 feet in height and 12 feet in diameter having a gas inlet 111 near its base, a gas outlet 114 located at the top of the tower, a liquid inlet 112 located near the top of the tower and a liquid outlet 115 located at the bottom of the tower.

There is also shown in the drawing a second vertically disposed tower 130, the desorbing unit, which is approximately 22 feet in height and 6 feet in diameter. This second tower 130 has a gas inlet 134 near its base, a gas outlet 131 at its top, a liquid inlet 132 near its top and a liquid outlet 135 at its bottom.

The liquid outlet 115 in tower 110 is connected to the liquid inlet 132 in tower 130 by means of a pump 116, a pipe 117, a pipe 119, a heater 122 and a pipe 191. The liquid outlet 135 in tower 130 is connected to the liquid inlet 112 in tower 110 by means of a pump 136, a pipe 137, a heat exchanger 139 and a pipe 140. There is also provided between pipe 117 and pipe 119 a valve 190 which communicates with pipe 192. Both tower 110 and tower 130 are provided with a packing 142 and 144 respectively which comprises stainless steel chips. Those skilled in the art will appreciate that other means for effecting good liquid-gas contacting, as for example, bubble plates may be substituted for the stainless steel chips packing used herein.

In this embodiment there is also shown a second absorbing unit and its cooperating desorbing unit. As mentioned before conditions are separately optimized for each unit for optimum performance. In FIG. 2 there is shown a vertically disposed absorbing unit comprising a multiple plate stripping tower 150 of about 24 feet in height and 10 feet in diameter having a gas inlet 151 near its base, a gas outlet 154 located at the top of the tower, a liquid inlet 152 located near the top of the tower and a liquid outlet 155 located at the bottom of the tower.

There is also shown in the drawing a second vertically disposed tower 170, the desorbing unit, which is approximately 22 feet in height and 5 feet in diameter. This second tower 170 has a gas inlet 174 near its base, a gas outlet 171 at its top, a liquid inlet 172 near its top and a liquid outlet 175 at its bottom.

The liquid outlet 175 in tower 170 is connected to the liquid inlet 112 in tower 110 and the liquid inlet 152 in tower 150 by means of a pump 176, a pipe 177, a cooler 179, a pipe 180, a pipe 181 and a pipe 182. The liquid outlet 155 in tower 150 is connected to the liquid inlet 172 in tower 170 by means of a pump 156, a pipe 157, a heater 159 and a pipe 160. Both tower 150 and 170 are provided with a packing 196 and 197 respectively which comprises stainless steel chips. Those skilled in the art will appreciate that other means for effecting good liquid-gas contacting, as for example, bubble plates may be substituted for stainless steel chips packing used herein.

In operation, 108,990 pounds per hour of a gas from a nitric acid process reactor containing about 2.2% is fed into the tower 110 by means of gas inlet 111. Nine thousand eight hundred and seventy five pounds per hour of stripping gas from tower 170 enters tower 110 through gas inlet 111 by means of line 189. Three hundred forty three thousand six hundred and sixty five pounds per hour of a stripping liquid comprising nitric acid at a concentration of between about 10 to about 35% (by weight), preferably about 20% at about 45° F., is fed into tower 110 through liquid inlet 112. A second liquid inlet 143 is located just above the midpoint of tower 110 and 343,665 pounds per hour of absorbing liquid at 61° F., enters tower 110 through liquid inlet 143 through pipe 145. The absorbing liquid descends the tower 110 by reason of gravity into packing 142 where it countercurrently contacts the gases, fed into the tower 110 through inlet 111, which are rising in the tower. The descending liquid strips the NOx from the ascending gases and dissolves them. It is important to note that the temperature of the tower be maintained subambient. That is, this temperature should be between about 35° to about 90° F., preferably from about 45° F. at the top of the tower to about 55° F. at the bottom, to provide a maximum absorption of NOx from the ascending gases by the liquid.

Six hundred eighty nine thousand three hundred and thirty pounds per hour of liquid, now containing absorbed NOx, exits tower 110 by means of liquid outlet 115 where it is pumped by means of pump 116 into pipe 117. There is provided a valve 190 that bleeds some of the NOx rich liquid off from pipe 117 through pipe 192 before it enters pipe 119. Two hundred twenty nine thousand and five pounds per hour of the liquid flows through line 119 into a heat exchanger 122 where it is heated to a temperature of about 75° F. and then passes through pipe 191. Four hundred sixty five thousand five hundred and ninety pounds per hour of liquid at 55° F. enters tower 130 through liquid inlet 128 after passing through line 126 and regulator valve 127. The temperature at the top of tower 130 is about 75° and about 61° F. at its bottom. The liquid in pipe 191 enters tower 130 through liquid inlet 132. Once inside tower 130 the liquid descends by reason of gravity through the packing 144 where it countercurrently contacts a stripping gas, preferably air, which after entering tower 130 through gas inlet 134 at a rate of 27,090 pounds per hour ascends the tower 130 into packing 144. As the NOx partial pressure of this stripping gas is much, much less than the NOx partial pressure in the liquid, the stripping gas desorbs the NOx dissolved in the liquid to leave the liquid virtually NOx free.

A total of 695,835 pounds per hour of liquid exits tower 130 by means of liquid outlet 135 where it is forced by means of pump 136 into pipe 137 through heat exchanger 139 where it is cooled to about 45° F. Eight thousand five hundred and five pounds per hour of nitric acid is removed and sent to a reactor section through line 192. From heat exchanger 139 the liquid passes through pipe 140 and is returned to tower 110 through liquid inlet 112 to serve as the stripping liquid for this tower. Optionally, there is provided in tower 110 a liquid inlet 143 which communicates with pipe 140 by means of a pipe 145. In this way a part of the liquid in pipe 140 may enter tower 110 through liquid inlet 143 as a recycle liquid.

The stripping gas, at a rate of 28,350 pounds per hour, now containing about 1260 pounds per hour of $NO_2$ exits tower 130 through gas outlet 131. This gas then passes through pipe 141 where it is returned to a reactor section (not shown) for further conversion to additional nitric acid product.

The off-gases from tower 110 pass through pipe 184 and enter tower 150 through a gas inlet 151 at a rate of 114,345 pounds per hour near the bottom of tower 150. An absorbing liquid comprising nitric acid at a concentration of between about 10 to about 35% (by weight), preferably about 20% is fed into tower 150 through liquid inlet 152 at a rate of 248,220 pounds per hour. The absorbing liquid descends the tower 150 by reason of gravity into packing 196 where it countercurrently contacts the gases, fed into the tower 150 through inlet 151, which are rising in the tower. The descending liquid absorbs the NOx from the ascending gases and dissolves them. It is important to note that the temperature of the tower be maintained subambient. That is, this temperature should be between about 35° to about 90° F., preferably about 70° F., to provide a maximum stripping of NOx from the ascending gases by the liquid. It is also important that a temperature gradient should exist in the tower, i.e., warmer at its top and cooler at its bottom, to maximize NOx absorption by this liquid.

After the liquid, now containing absorbed NOx, leaves the packing 196 its exits tower 150 by means of liquid outlet 155 where it is pumped by means of pump 156 into pipe 157. The liquid flows through line 157 into a heat exchanger 159 where it is heated to a temperature of about 120° F. and then passes into pipe 160. The liquid in pipe 160 enters tower 170 through liquid inlet 172. Once inside tower 170 the liquid descends by reason of gravity through the packing 197 where it countercurrently contacts a stripping gas, preferably air, which after entering tower 170 through gas inlet 174 ascends the tower 170 into packing 197. As the NOx partial pressure of this stripping gas is much, much less than the NOx partial pressure in the liquid, the stripping gas desorbs the NOx dissolved in the liquid to leave the liquid virtually NOx free.

This liquid exits tower 170 by means of liquid outlet 175 where it is forced by means of pump 176 into pipe 177 through heat exchanger 179 where it is cooled to about 35° F. From heat exchanger 179 the liquid passes through pipe 181 and is returned to tower 150 through liquid inlet 152 to serve as the absorbing liquid for this tower. Some of the liquid from heat exchanger 179 passes through pipe 182 and is returned to tower 110 through liquid inlet 112 by means of pipe 146 to serve as the absorbing liquid inlet for this tower.

The stripping gas at a rate of 8,000 pounds per hour now containing about 126 pounds per hour of $NO_2$ exits tower 170 through gas outlet 171. This gas then passes through pipe 198 where it is returned to the reactor section (not shown) for further conversion to additional nitric acid product. The off-gases from tower 150 exit this tower through gas outlet 154 at a rate of 114,345 pounds per hour. After passing through a regulator valve 194 these gases, containing about 22 pounds per hour of $NO_2$ (0.02%), exhaust to the atmosphere through pipe 195.

We claim as our invention:

1. A method of concentrating nitrogen oxides from a stream comprising a noncondensable mixture of oxygen and nitrogen and below about 2.5% by weight of a mixture of nitrogen oxides which comprises:

introducing said stream into an absorption zone maintained at a temperature of below about 90° F and at about atmospheric pressure;

contacting said stream in said absorption zone with a countercurrently flowing stream consisting essentially of between about 10 and about 35% by weight nitric acid to absorb said nitrogen oxides from said stream in said nitric acid stream, the rate of flow of said nitric acid into said absorption zone being such that the partial pressure of the nitrogen oxides absorbed in said nitric acid is lower than the partial pressure of the nitrogen oxides in said stream;

withdrawing said noncondensable mixture of oxygen and nitrogen from said absorption zone;

passing the resulting solution of nitrogen oxides in said nitric acid liquid in descending countercurrent contact in a stripping zone with an ascending stream of air at a temperature of between about 60° and about 120° F and at about atmospheric pressure to essentially strip said nitrogen oxides from said nitric acid liquid;

returning the resulting nitric acid liquid to the absorption zone; and recovering the resulting stream of air and concentrated nitrogen oxides.

2. The method of claim 1 wherein said stream is passed in descending countercurrent contact with about 15 to about 20% nitric acid liquid in an absorption zone maintained at a temperature between about 35° and about 80° F and at about atmospheric pressure to absorb said minor amount of said nitrogen oxides from said stream in said nitric acid liquid, the rate of flow of said nitric acid liquid into said absorption zone being such that the partial pressure of said nitrogen oxides absorbed in said nitric acid liquid is lower than the partial pressure of the nitrogen oxides in said stream.

* * * * *